(12) United States Patent
Bennett et al.

(10) Patent No.: US 7,854,117 B1
(45) Date of Patent: Dec. 21, 2010

(54) CENTER SECTION FOR HYDRAULIC TRANSMISSION

(75) Inventors: Michael L. Bennett, Sullivan, IL (US); Scott W. Keller, Charleston, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 89 days.

(21) Appl. No.: 12/396,073

(22) Filed: Mar. 2, 2009

Related U.S. Application Data

(63) Continuation of application No. 11/613,628, filed on Dec. 20, 2006, now Pat. No. 7,497,082.

(60) Provisional application No. 60/753,296, filed on Dec. 22, 2005.

(51) Int. Cl.
*F16H 47/02* (2006.01)
*F16H 57/02* (2006.01)

(52) U.S. Cl. .............................. 60/487; 60/453; 60/489

(58) Field of Classification Search .................. 60/453, 60/487, 489
See application file for complete search history.

(56) References Cited

U.S. PATENT DOCUMENTS

| | | | |
|---|---|---|---|
| 4,903,545 A | 2/1990 | Louis et al. | |
| 5,074,195 A | 12/1991 | Ohashi et al. | |
| 5,314,387 A | 5/1994 | Hauser et al. | |
| 5,505,279 A | 4/1996 | Louis et al. | |
| 6,122,996 A | 9/2000 | Hauser et al. | |
| 6,301,885 B1 | 10/2001 | Johnson et al. | |
| 6,390,227 B1 | 5/2002 | Abend et al. | |
| 6,467,263 B2 | 10/2002 | Johnson et al. | |
| 6,715,283 B2 | 4/2004 | Abend et al. | |
| 7,040,092 B1 * | 5/2006 | Buescher | 60/489 |
| 7,497,082 B1 | 3/2009 | Bennett et al. | |

FOREIGN PATENT DOCUMENTS

JP 05-172204 7/1993

* cited by examiner

*Primary Examiner*—Thomas E Lazo
(74) *Attorney, Agent, or Firm*—Neal Gerber & Eisenberg LLP

(57) ABSTRACT

A center section assembly for mounting inside the housing of a hydrostatic or hydraulic drive apparatus is disclosed. The center section includes generally flat side edge surfaces formed adjacent and perpendicular to a cylinder block running surface, and shaped to engage a channel formed in an internal surface of the housing to secure the center section to the housing. The assembly may also include a filter using a connection member to permit the filter to slide on and engage the peripheral edge of a flange formed on the center section.

17 Claims, 8 Drawing Sheets

CENTER SECTION FOR HYDRAULIC TRANSMISSION

CROSS-REFERENCE

This invention is a continuation of U.S. patent application Ser. No. 11/613,628 filed on Dec. 20, 2006, now U.S. Pat. No. 7,497,082, which claims the priority of U.S. Provisional Patent Application Ser. No. 60/753,296 filed on Dec. 22, 2005. These applications are incorporated herein by reference in their entirety.

BACKGROUND OF THE INVENTION

This invention relates to a center section for use in a hydrostatic transmission ("HST"), an integrated hydrostatic transaxle ("IHT") or other hydraulic drive device.

Center sections containing hydraulic porting for connecting a rotating hydraulic pump and motor are known in the art and are disclosed in, e.g., commonly owned U.S. Pat. Nos. 5,314,387 and 6,122,996, the terms of which are incorporated herein by reference. The invention disclosed herein is an improved center section for use in an IHT or an HST, where the center section is of a two-piece design. Two-piece center sections for use in an IHT are also known and are disclosed, for example, in commonly owned U.S. Pat. No. 7,040,092, the terms of which are incorporated herein by reference.

SUMMARY OF THE INVENTION

The subject invention relates to an improved method for assembling and mounting a two-piece center section in a transmission housing. It also discloses a center section where the elements are preferably identical in construction and thus interchangeable.

A better understanding of the objects, advantages, features, properties and relationships of the invention will be obtained from the following detailed description and accompanying drawings which set forth an illustrative embodiment and is indicative of the various ways in which the principles of the invention may be employed.

DETAILED DESCRIPTION OF THE DRAWINGS

Figure 1:
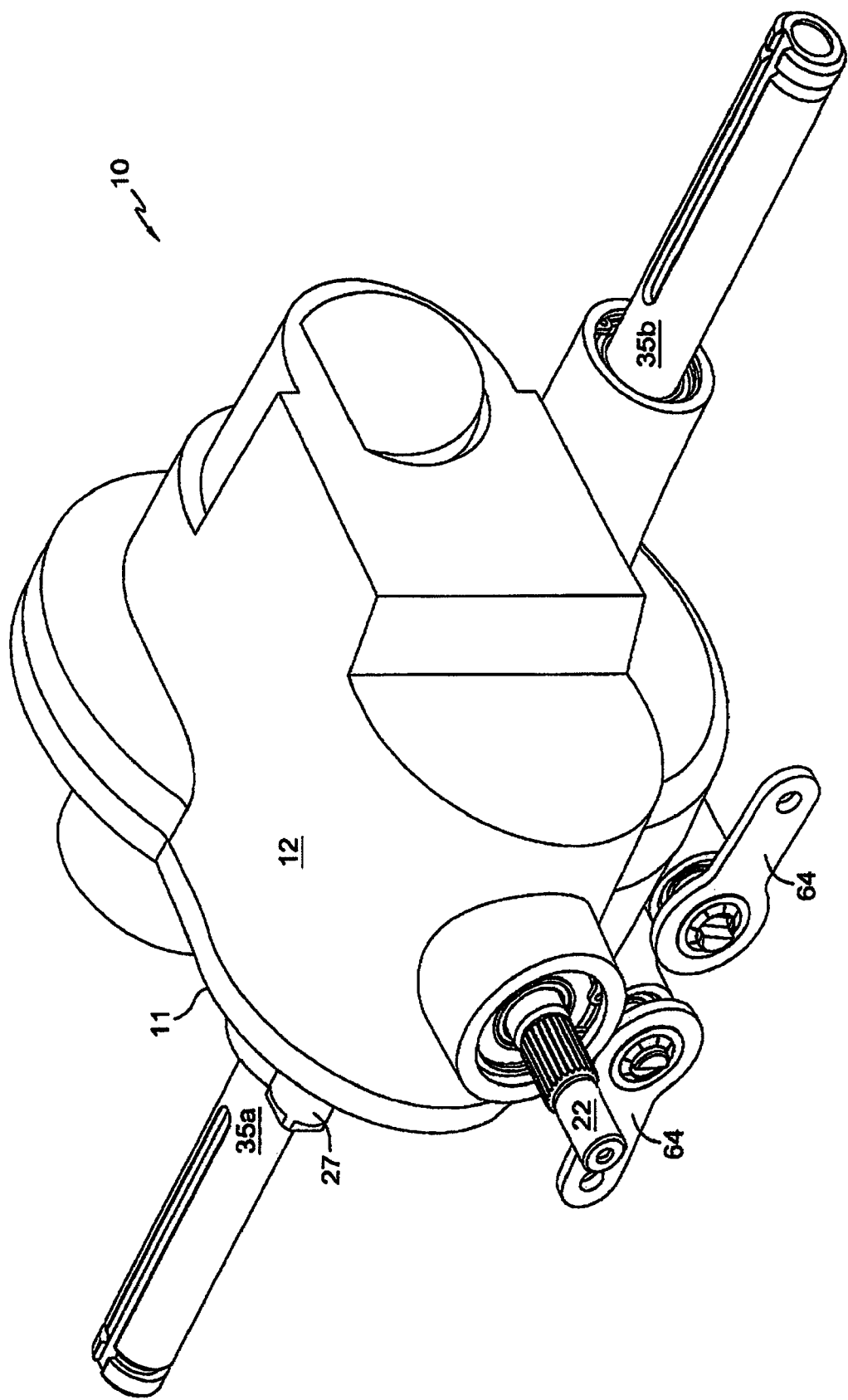
FIG. 1 is a perspective view of an exemplary hydraulic drive apparatus in which a center section assembly in accordance with the present invention is mounted.
Figure 2:
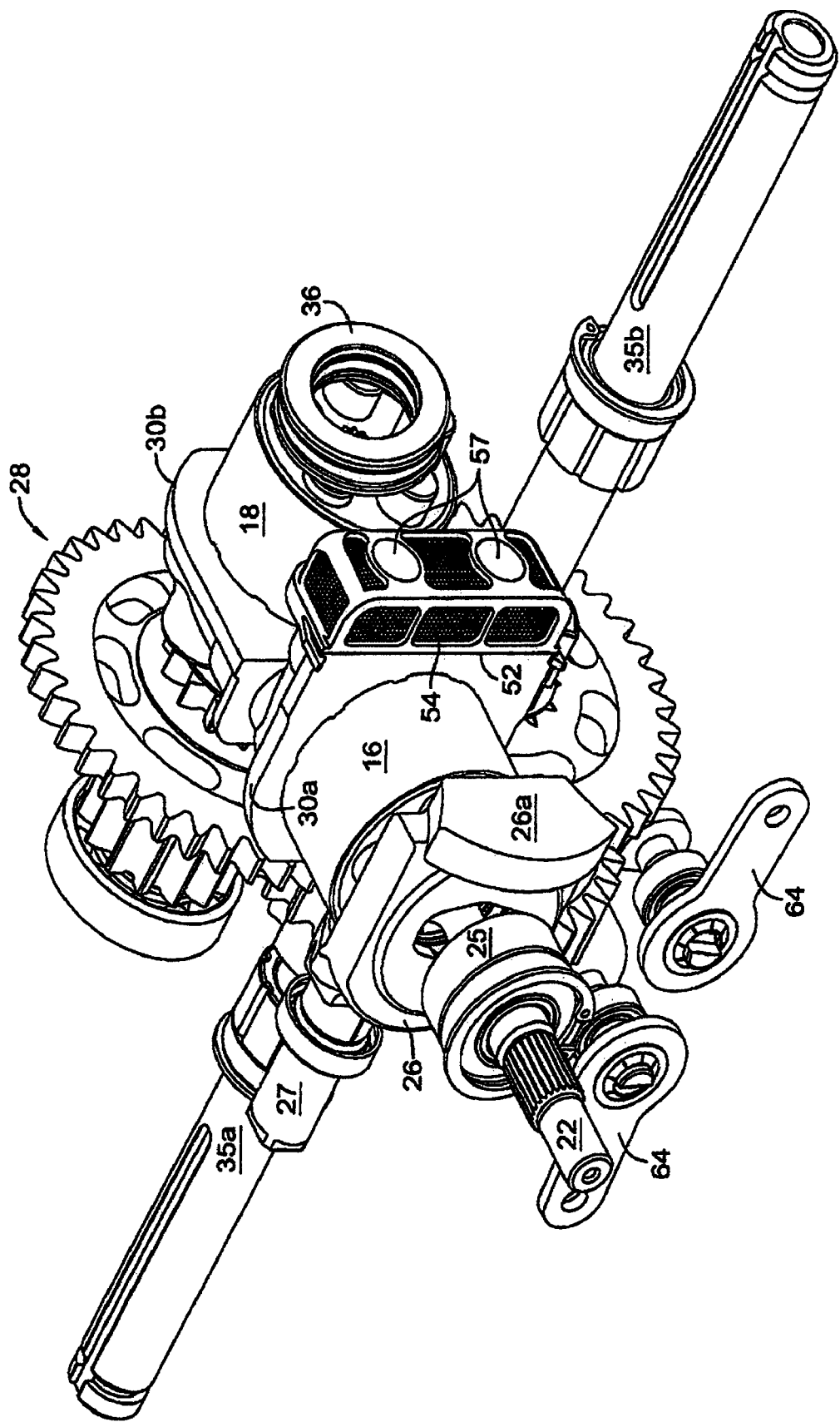
FIG. 2 is a perspective view of the hydraulic drive apparatus shown in FIG. 1, with the housing elements removed to show the internal structure of the apparatus, including a center section in accordance with the present invention.

An exemplary drive apparatus 10 in accordance with the present invention is shown in FIG. 1, where housing members 11 and 12 are joined along a split line perpendicular to the output axles 35a and 35b. The hydraulic features of drive apparatus 10 are shown most clearly in FIG. 2, which is similar to FIG. 1 but where housing members 11 and 12 have been removed for clarity.

Figure 3:
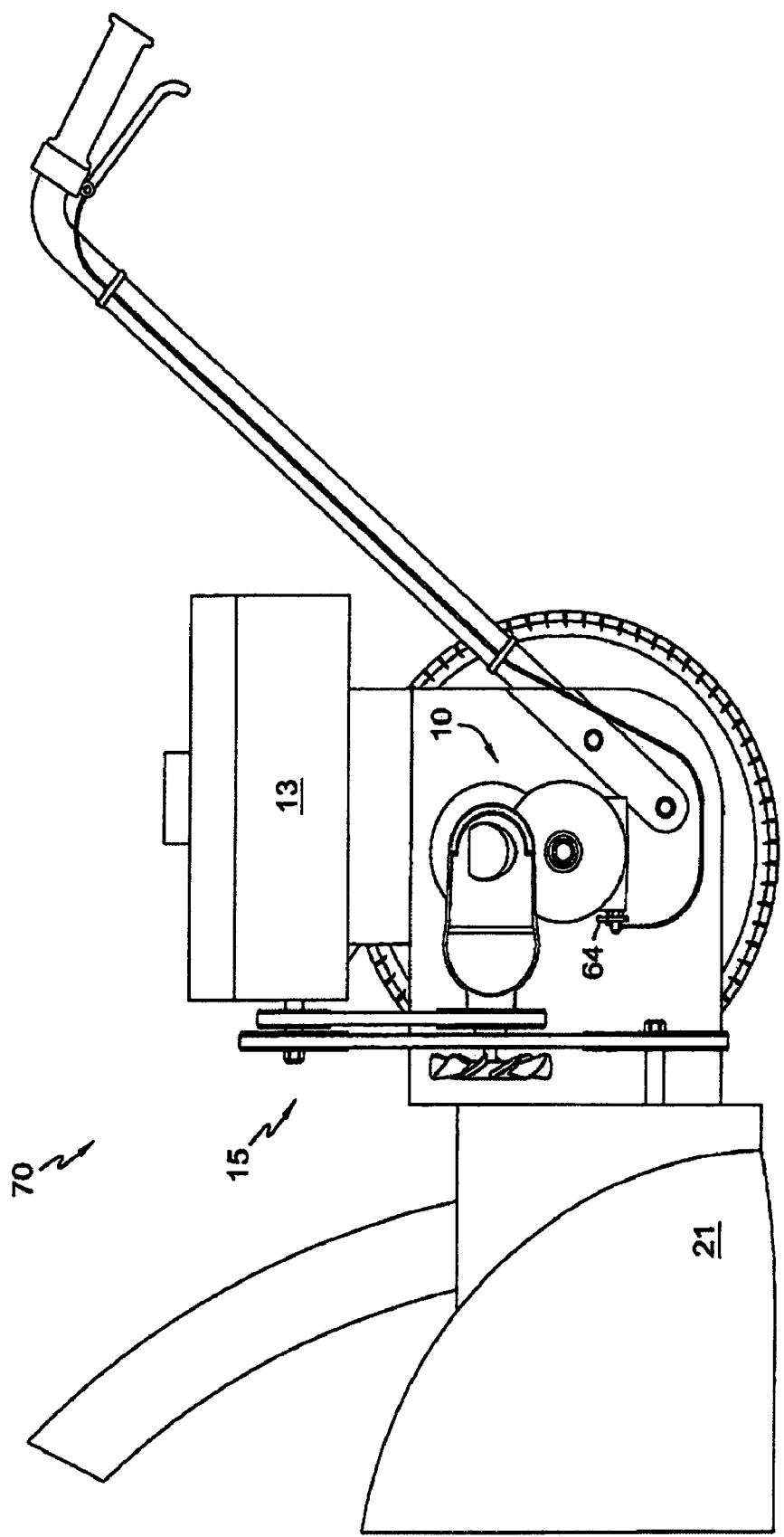
FIG. 3 is an elevational view of an exemplary vehicle incorporating the hydraulic drive apparatus shown in FIG. 1.

It will be understood that the invention disclosed herein may be used in various types of drive mechanisms and for various applications, such as vehicles, industrial applications, etc. In the embodiment depicted in FIG. 3, drive apparatus 10 is used in snow thrower 70, having prime mover 13 powering both drive transmission 10 and snow thrower device 21 through pulley system 15.

In depicted embodiment, input shaft 22 extends into housing member 12, where it is supported by bearing 25, and is splined to pump assembly 16 comprising cylinder block (not shown) and pump pistons (not shown) in a known manner. Swash plate 26 is engaged to pump assembly 16 to control the output of pump assembly 16. Trunnion arm 27 extends from swash plate 26 and through housing member 11 to a control mechanism (not shown). Support member 26a is formed as part of the swash plate 26 to engage an internal surface (not shown) in housing member 12 for support.

Figure 4:
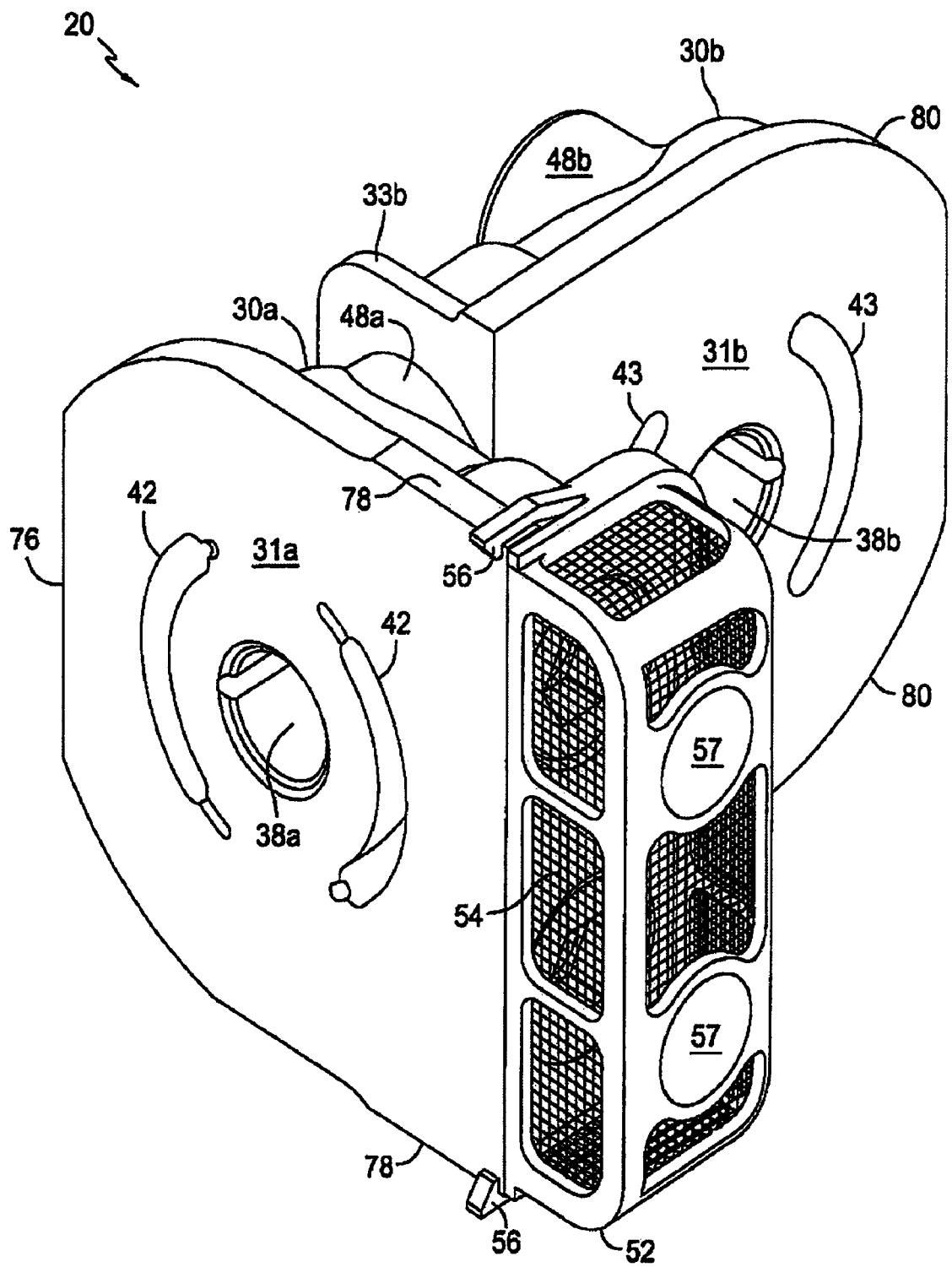
FIG. 4 is a perspective view of a two-piece center section in accordance with the subject invention.
Figure 5:
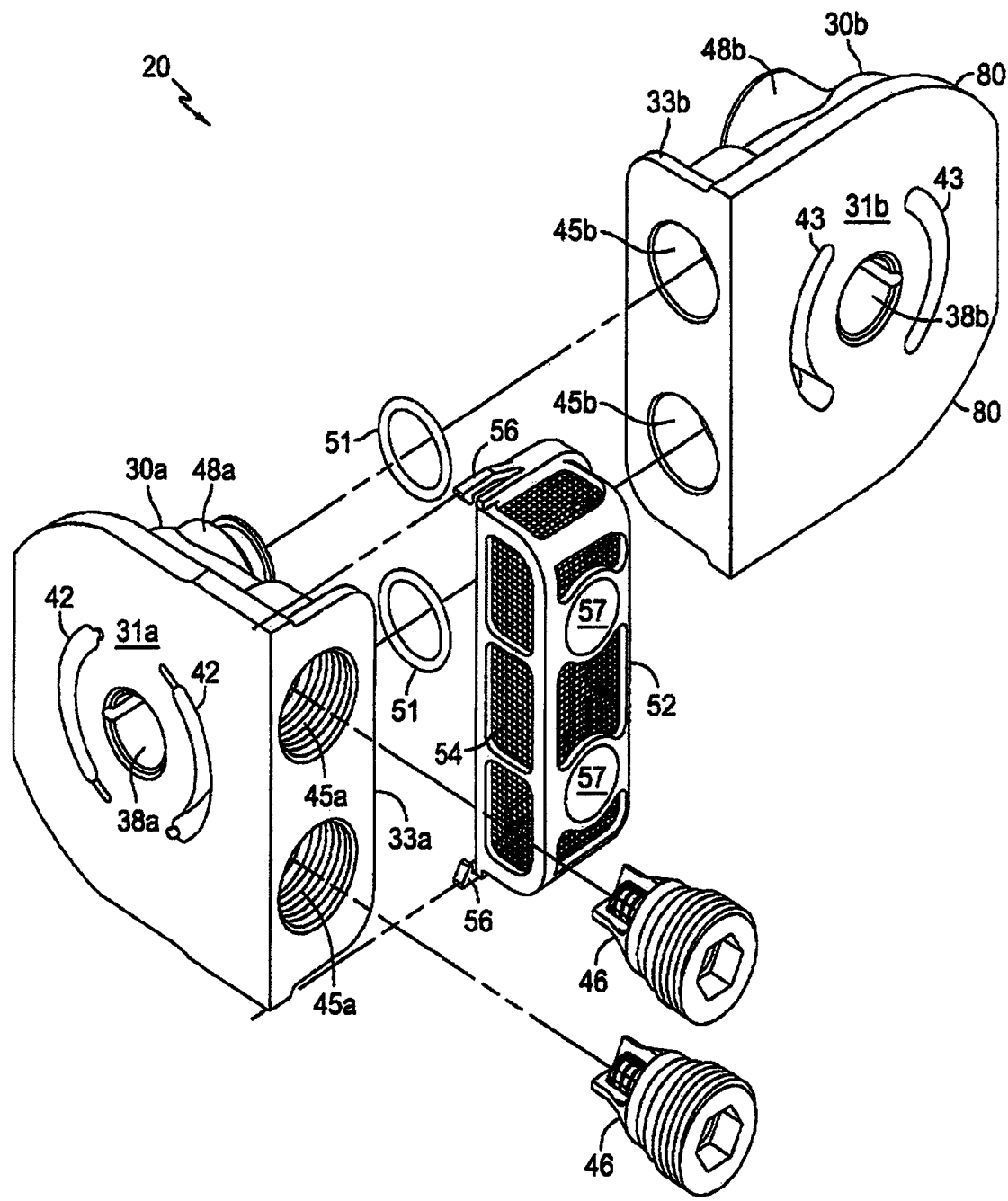
FIG. 5 is an exploded perspective view of the center section.
Figure 6:
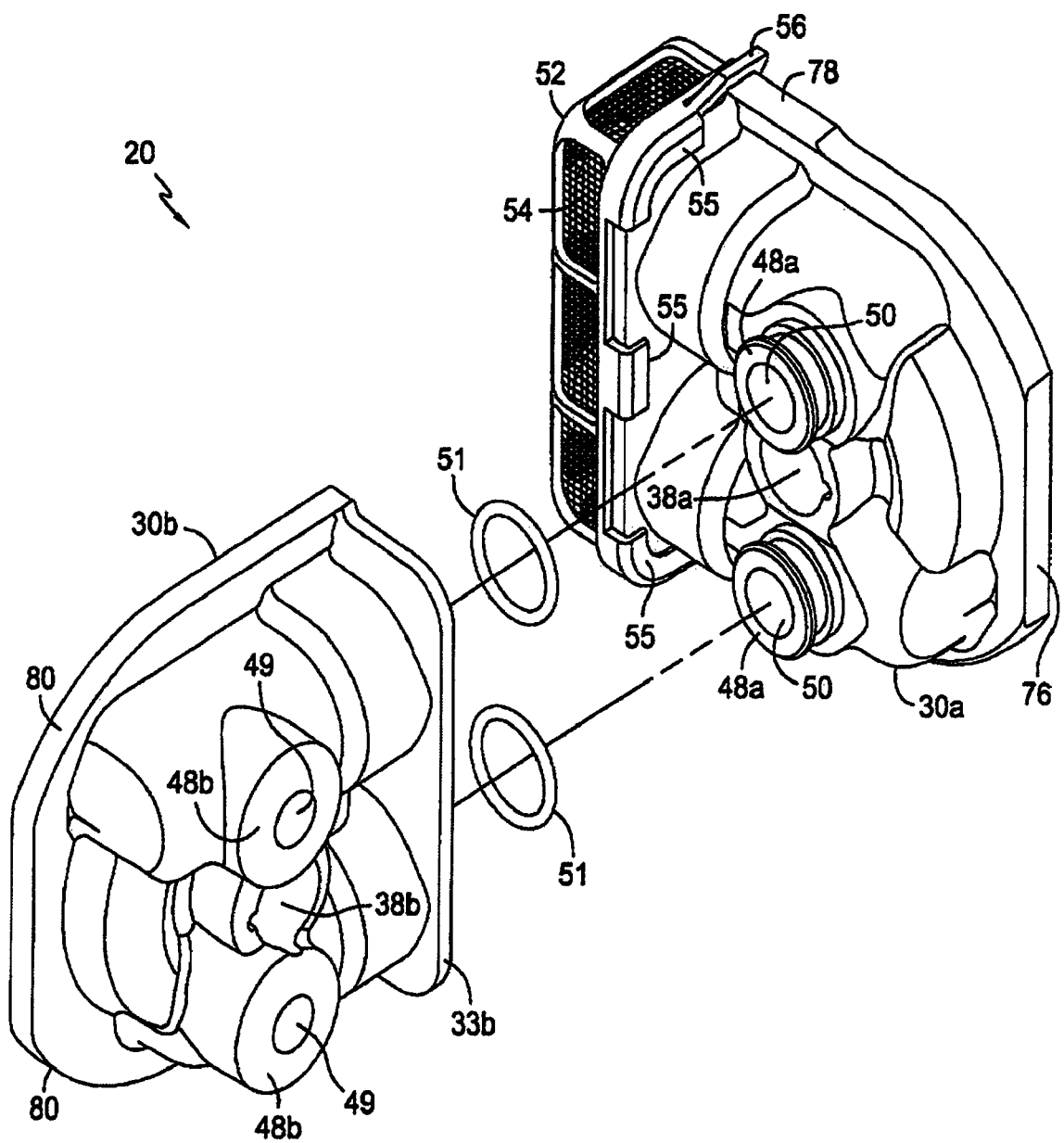
FIG. 6 is a further exploded perspective view of the center section.

The two piece center section 20 is shown most clearly in FIGS. 4-6. In the depicted embodiment, center section 20 comprises separate elements 30a and 30b which are formed from the same casting and are thus similar in construction. This similarity reduces costs since it eliminates the need for different parts and simplifies assembly. In the embodiment depicted herein, element 30a is being used to support pump assembly 16 and element 30b is being used to support motor assembly 18; for the sake of clarity the different features of each will be described in connection with these functions.

Elements 30a and 30b may be described as being essentially identical, in that they contain the same features and are cast or otherwise created in an identical manner in order to reduce costs. Elements 30a and 30b are thereafter operationally differentiated through various machining processes to create features associated with extensions 48a, kidney ports 42 and 43, and port openings 45a and 45b, depending on the use of the respective center section element.

Element 30a comprises an opening 38a on cylinder block running surface 31a through which pump input shaft 22 extends. Cylinder block running surface 31a supports pump assembly 16, and the pair of kidney ports 42 connect pump assembly 16 to hydraulic porting (not shown), as described below. Flange 33a, as shown in FIG. 5, extends generally perpendicular to running surface 31a and includes a pair of port openings 45a formed therein, as will be discussed in more detail below.

Motor assembly 18 is rotatably supported on running surface 31b of element 30b and drives a motor shaft (not shown) in a known manner. Thrust bearing 36 is fixed in housing member 12 and engaged to motor assembly 18. Opening 38b is formed to permit the motor shaft to extend through center section element 30b to drive gear train 28, as described below.

Center section 20 includes hydraulic porting which, in the depicted embodiment, comprises kidney ports 42 and 43, a pair of extensions 48a and 48b and a pair of port openings 45a and 45b. The porting in both elements 30a and 30b cooperates to form a closed hydraulic circuit connection between pump assembly 16 and motor assembly 18. Additional porting (not shown) is formed inside the two center section elements 30a and 30b to connect the various openings described.

Both of the center section elements 30a and 30b have a pair of generally cylindrical extensions 48a and 48b, respectively, formed on a surface generally opposite running surfaces 31a and 31b thereof. Generally cylindrical extensions 48b are cast such that a web 49 blocks access to porting formed inside element 30b. Openings 50 are formed in extensions 48a to permit the porting formed in element 30a to communicate with the porting formed in element 30b once element 30a is assembled to element 30b.

Figure 7:
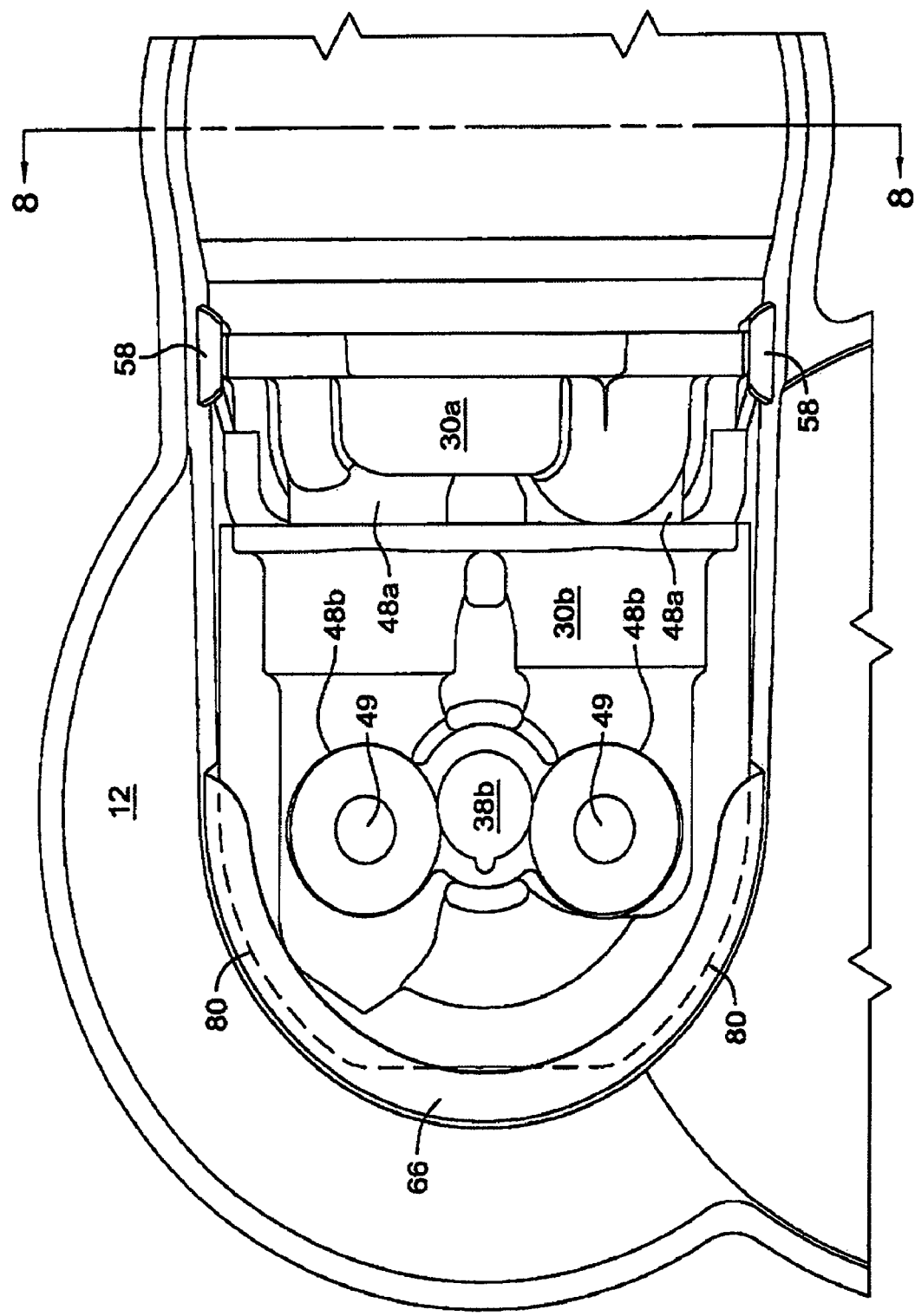
FIG. 7 is an elevational view of the center section in accordance with the subject invention mounted in a housing.

In the depicted embodiment, extensions 48a on element 30a extend into port openings 45b on element 30b, and are sealed by o-rings 51, to create a portion of the closed hydraulic circuit. This connection eliminates the need for separate fasteners connecting elements 30a and 30b. Moreover, as is known in the art, each pump piston (not shown) of pump assembly 16 comprises a spring (not shown), biasing each pump piston against swash plate 26. This spring force also acts against element 30a, maintaining the position and hydraulic communication between elements 30a and 30b. Tabs 58 and support element 60 further constrain element 30a, as described below, and as shown in FIG. 7.

Center section element 30a includes a pair of port openings 45a formed in flange 33a, with a pair of check valves 46 threaded therein to permit hydraulic fluid to be brought into the closed hydraulic circuit when needed, a filter comprising filter housing 52 with dispersion plates 57 and mesh filter 54 located therein, is connected to flange 33a by means of protrusion 55 and fingers 56, which permit filter housing 52 to be slid onto the edges of flange 33a and snapped in place, without the need for additional fasteners. In this embodiment protrusions 55 are formed away from filter housing 52 lower surface in a hook-like shape in order to capture the edge of flange 33a while snap fingers 56 clip onto running surface 31a. Protrusions 55 may be formed in segments as shown in FIG. 6 or may be continuous to capture more area of flange 33a. This configuration may improve separation of the filtered fluid from the sump when certain materials are used to form filter housing 52. Dispersion plates 57 prevent damage to mesh filter 54 from possible bleed fluid ejected from check valves 46.

The motor shaft is connected to and drives gear train 28. In this particular application, gear train 28 drives output axles 35a and 35b, respectively, without the need for a differential. Control mechanisms 64 extend outside housing 12 to separately control output to axles 35a and 35b. Obviously such a drive mechanism is not critical to this invention, and the center section disclosed herein could be used with other drive devices.

Figure 8:
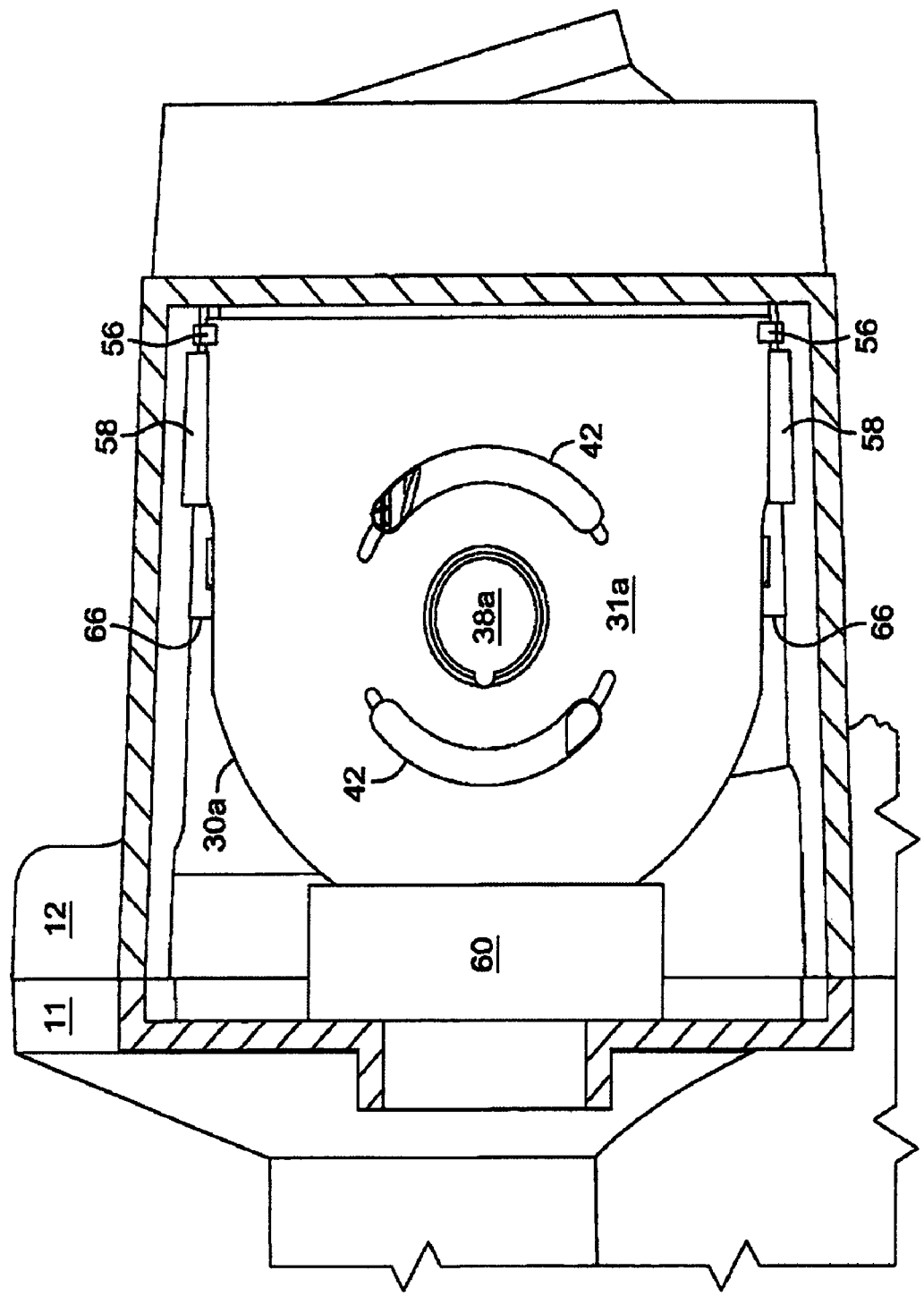
FIG. 8 is a sectional view along the lines 8-8 in FIG. 7.

A further feature of this center section design is that it can be mounted in a housing without the need for any separate fasteners. Such designs have been used in the past, but generally include separate projections, or "wings" extending from one portion of the center section. One widely known design is shown in Japanese Publication No. 05-172204, where the center section includes separate "wings" extending from opposite sides thereof to engage corresponding slots in the sides of the housing. The present invention eliminates the need for separate wings or projections by using primary running surface edges 76, 78 and 80 of center section elements 30a and 30b as a means by which center section 20 is secured to the housing. As shown in FIGS. 7 and 8, housing member 12 includes a channel 66 which cooperates with running surface edge 80 to constrain center section element 30b. Center section 30b slides into channel 66 and is thus secured to housing 12. Element 30a interfaces with element 30b by extensions 48a with pre-positioned o-rings 51 extending into port openings 45b. Center section element 30a is secured to housing member 12 by tabs 58 contacting running face edge 78. Center section element 30a is further constrained by support member 60 formed on side housing 11 securing element 30a along running face edge 76.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

The invention claimed is:

1. A hydraulic drive apparatus comprising:
    a housing member forming a sump;
    a center section disposed in the sump and comprising a pump running surface, a motor running surface, a hydraulic porting system formed in the center section to connect the pump running surface to the motor running surface, a plurality of sides adjacent to one of the pump running surface or the motor running surface, and a generally flat side edge surface extending along a portion of the plurality of sides, wherein the side edge surface is generally perpendicular to the one of the pump running surface or the motor running surface; and
    a channel formed in an internal surface of the housing member to receive the side edge surface.

2. The hydraulic drive apparatus of claim 1, wherein the side edge surface of the center section is located adjacent to the pump running surface.

3. The hydraulic drive apparatus of claim 1, wherein the center section further comprises a flange formed on one of the plurality of sides, and a plurality of openings formed in the flange and connected to the hydraulic porting system.

4. The hydraulic drive apparatus of claim 3, further comprising a filter attached to the flange to filter hydraulic fluid entering the hydraulic porting system from the sump through one of the plurality of openings, the filter comprising a connection member permitting the filter to slide on and engage a peripheral edge of the flange.

5. The hydraulic drive apparatus of claim 4, wherein the connection member comprises a plurality of fingers and at least one protrusion to engage the peripheral edge of the flange.

6. The hydraulic drive apparatus of claim 5, wherein the side edge surface of the center section is located adjacent to the pump running surface.

7. The hydraulic drive apparatus of claim 4, further comprising a plurality of check valves, each check valve being disposed in one of the plurality of openings in the flange to control the flow of fluid between the sump and the hydraulic porting system.

8. A center section for use in a hydraulic drive apparatus having a hydraulic cylinder block disposed in a housing forming a sump, the center section comprising:
    a running surface for the cylinder block and a hydraulic porting system connected to the running surface; and
    plurality of side edge surfaces formed adjacent and perpendicular to the running surface, wherein the side edge surfaces are generally flat and shaped to engage a channel formed in an internal surface of the housing to secure the center section to the housing.

9. The center section of claim 8, further comprising a flange formed thereon, a plurality of openings formed in the flange and connected to the hydraulic porting system, a filter housing having a filter member to filter hydraulic fluid entering the hydraulic porting system from the sump and a connection member permitting the filter housing to slide on and engage a peripheral edge of the flange.

10. The center section of claim 9, wherein the connection member comprises plurality of fingers and at least one protrusion to engage the peripheral edge of the flange.

11. A hydraulic drive apparatus comprising:
   a housing forming a sump;
   a center section assembly disposed in the sump and comprising a running surface for a rotatable cylinder block and a flange generally perpendicular to the running surface, the flange having a pair of openings formed therein and an edge extending around at least a portion of the periphery of the flange;
   hydraulic porting formed in the center section assembly and connected to the running surface and to the pair of openings formed in the flange; and
   a filter housing attached to the flange and comprising a filter member to filter hydraulic fluid entering the hydraulic porting from the sump, the filter housing further comprising a connection member permitting the filter housing to slide on and engage the peripheral edge of the flange.

12. The hydraulic drive apparatus of claim 11, wherein the connection member comprises a plurality of fingers and at least one protrusion to engage the peripheral edge of the flange.

13. The hydraulic drive apparatus of claim 11, wherein the center section assembly further comprises a second running surface for a second rotatable cylinder block, and the hydraulic porting is further connected to the second running surface to permit fluid communication between the two rotatable cylinder blocks.

14. The hydraulic drive apparatus of claim 11, further comprising a pair of check valves, each check valve being disposed in one of the pair of openings to control the flow of fluid between the sump and the hydraulic porting.

15. A center section assembly for use in a hydraulic drive apparatus having a hydraulic cylinder block disposed in a housing forming a sump, the center section assembly comprising:
   a running surface for the cylinder block and a flange generally perpendicular to the running surface, the flange having an edge extending around at least a portion of the periphery thereof;
   hydraulic porting formed in the center section assembly and comprising a first pair of openings formed in the center section flange and a second pair of openings formed in the running surface;
   a pair of check valves, each check valve being disposed in one of the first pair of openings to control the flow of fluid between the sump and the hydraulic porting; and
   filter housing comprising a filter member to filter hydraulic fluid entering the check valves from the sump and a connection member permitting the filter housing to slide on and engage the peripheral edge of the flange.

16. The center section assembly of claim 15, wherein the connection member comprises a plurality of fingers and at least one protrusion to engage the peripheral edge of the flange.

17. The center section assembly of claim 15, further comprising a second running surface for a second hydraulic cylinder block, and the hydraulic porting comprises a third pair of openings formed in the second running surface.

* * * * *